United States Patent [19]

Machida et al.

[11] Patent Number: 4,783,383

[45] Date of Patent: Nov. 8, 1988

[54] SEALED TYPE BATTERY PROVIDED WITH SAFETY VALVE MEANS AND METHOD OF MANUFACTURING SAME

[75] Inventors: Toyoji Machida; Satoshi Narukawa; Akiyoshi Sakai, all of Sumoto; Nobuhiro Nagao, Mihara; Yoshihiro Tobita, Sumoto; Kanji Urushihara, Sumoto; Hitoshi Nakashima, deceased, late of Sumoto, all of Japan, by Kayoko Nakashima, executor

[73] Assignee: Sanyo Electric Co., Ltd., Japan

[21] Appl. No.: 125,641

[22] Filed: Nov. 25, 1987

[30] Foreign Application Priority Data

| | | | |
|---|---|---|---|
| Dec. 2, 1986 | [JP] | Japan | 61-185904[U] |
| Apr. 16, 1987 | [JP] | Japan | 62-93702 |
| Jun. 30, 1987 | [JP] | Japan | 62-101467[U] |

[51] Int. Cl.[4] .......... H01M 2/12

[52] U.S. Cl. .......... 429/56; 429/174; 429/181; 29/623.2

[58] Field of Search .......... 429/56, 55, 54, 181, 429/171, 174; 29/623.2

[56] References Cited

U.S. PATENT DOCUMENTS

| | | | |
|---|---|---|---|
| 3,537,903 | 11/1970 | Braun | 429/54 |
| 3,834,942 | 9/1974 | Tietze | 429/56 |
| 4,345,611 | 8/1982 | Ikeda et al. | 429/56 |
| 4,532,705 | 8/1985 | Zupancic et al. | 29/623.2 |

*Primary Examiner*—Donald L. Walton

*Attorney, Agent, or Firm*—Darby & Darby

[57] ABSTRACT

The present invention relates to a sealed type battery provided with a safety valve and a method of manufacturing the same, the sealed type battery of the present invention has a mouth-sealing plate, provided with the safety valve, serving as a terminal of one polarity, being arranged through an insulating member in a hole of a metallic cover closing an opened portion of an exterior can serving as a terminal of the other polarity, and an extension of a hole edge of the metallic cover being cramped to the insulating member to fix said mouth-sealing plate, whereby the cramping diameter can be reduced in comparison with that of the conventional battery, and as a result, the high hermeticity can be given to the battery and the electrolyte can be completely prevented from leaking.

10 Claims, 4 Drawing Sheets

52
62
53
51
51a 53
62
52
63
51

54
58
57
59
61
53
64
60
55
56
51

4
11
8
7
9
12
3
2a
22
6
10
5
17
2
1a
1

11
9
7
4
41
8
22
17
20
6
5
10
2
3

14
44
17
45

(a)
13
(b)
(c)
16
15
17
14
(d)
18
14
17
(e)
A
18
40
14
19
B
(f)
20
17
19
14
(g)
17
20
14
19
21
(h)
2
17
22
14
19
20

SEALED TYPE BATTERY PROVIDED WITH SAFETY VALVE MEANS AND METHOD OF MANUFACTURING SAME

BACKGROUND OF THE INVENTION

1. Field of the Invention

The present invention relates to a sealed type battery provided with a safety valve means and a method of manufacturing the same.

2. Description of the Prior Art

A battery, for which a stabilized hermeticity is required for a long time, having a hermetic-sealing construction using an insulating member 53 formed of glass or ceramics, as shown in FIG. 1, has been known. In this case, a terminal pin 62 of one polarity passes through the insulating member 53 arranged in a through-hole of a metallic cover 52 in a fixed manner and an exterior can 51 serving as a terminal of the other polarity is fixedly mounted on the metallic cover 52 by the laser welding and the like.

This hermetic-sealing construction has a difficult point in that a cost is high. Accordingly, a battery having a construction, in which an insulating member 53 formed of resins is used, a metallic washer 63 being put on a lower portion of a terminal pin 62 of one polarity passing through this insulating member 53 to fix the insulating member 53, as shown in FIG. 2, and a metallic cover 52 being fixedly mounted on an exterior can 51 in the same manner as in FIG. 1, has been proposed (Japanese Utility Model Laid-Open No. 22753/1985).

Such a battery has a high hermeticity, however, when it is misused or used in an abnormal environment, whereby an internal pressure of the battery is increased, there is the possibility that the battery is broken. Accordingly, various kinds of safety valve means are provided.

In the battery having the construction as shown in FIG. 1, a part 51*a* of the exterior can 51 has a wall thickness less than the rest so that this part 51*a* may be broken, whereby preventing the battery from being broken, when the internal pressure of the battery is abnormally increased. But, it is difficult to control a thickness of the part 51*a* and to set an operating pressure, so that a sufficient safety can not be achieved.

In addition, with the battery as shown in FIG. 2, when a temperature of the battery is abnormally increased, whereby increasing the internal pressure of the battery, gases within the battery are received to the outside of the battery through an opened portion formed when the insulating member 53 made of resins is molten, a joint portion of the insulating member 53 with the metallic cover 52 or cracked portions of the insulating member 53 in order to intend to lower the internal pressure of the battery and prevent the battery from being broken. But, also in this case, it is difficult to set the operating pressure, so that the safety valve is inferior in accuracy.

On the other hand, a sealed type battery provided with a highly accurate safety valve as shown in FIG. 3 has been known (Japanese Utility Model Laid-Open No. 87458/1986). The battery shown in FIG. 3 is provided with a mouth-sealing plate 54 serving as a terminal of one polarity provided with a safety valve comprising a mouth-sealing cover 56 provided with a valve hole 55, a flat head plate 59 provided with a vent hole 57 and a cutting blade 58, a flexible thin plate 60 always closing the valve hole 55 and an elastic member 61. This mouth-sealing plate 54 is mounted on the opened portion of the exterior can 51 through the insulating member 53.

In the battery having the construction shown in FIG. 3, a highly accurate safety valve is obtained but since an opened edge of the exterior can 51 is cramped to an outside surface of the insulating member 53 after pouring an electrolyte at the assembly of the battery, a liquid 64 is accumulated on a joint portion of the insulating member 53 with the exterior can 51 or a joint portion of the insulating member 53 with the mouth-sealing cover 56, whereby the liquid 64 is apt to leak out. In addition, since a cramping diameter of the exterior can 51 by the opened edge is large, a difficult point is in hermeticity.

SUMMARY OF THE INVENTION

The present invention has been achieved in order to solve the above described problems.

It is a first object of the present invention to provide a sealed type battery provided with a safety valve means improved in hermeticity in which a cramping diameter is reduced than that of the conventional battery by providing a mouth-sealing plate, which mounts a safety valve and serves as a terminal of one polarity through an insulating member, on a hole portion of a metallic cover closing an opened portion of an exterior can serving as the other polarity, and cramping an extension of the metallic cover to the insulating member to fix the mouth-sealing plate.

It is a second object of the present invention to provide a sealed type battery provided with a safety valve means improved in adhesion of the metallic cover to the insulating member by forming a projection at a position where a base of the extension of the metallic cover is engaged with the insulating member.

It is a third object of the present invention to provide a method of manufacturing a sealed type battery provided with a safety valve means capable of obtaining a sealed type battery having a high hermeticity and provided with a highly accurate safety valve by forming a cylindrical member having a bottom provide with a collar portion at an opened edge from a metallic plate, forming an opening at the bottom portion of the cylindrical member followed by deforming the cylindrical member so that an inside diameter of the cylindrical portion may be larger than that of the opening of a side of the collar portion, working so that a portion connecting the deformed cylindrical portion with the opening of a side of the collar portion may be engaged with or close to the collar portion to obtain the metallic cover, arranging a mouth-sealing plate provided with the safety valve within the cylindrical portion of the metallic cover through the insulating member, cramping the cylindrical portion to the insulating member to fix the mouth-sealing plate, and subsequently fixedly mounting the metallic cover on the opened portion of an exterior can in an electrically conductive manner.

The above and further objects and features of the invention will more fully be apparent from the following detailed description with accompanying drawing.

DETAILED DESCRIPTION OF THE PREFERRED EMBODIMENTS

The present invention will be below described with reference to the preferred embodiments.

Figure 4:
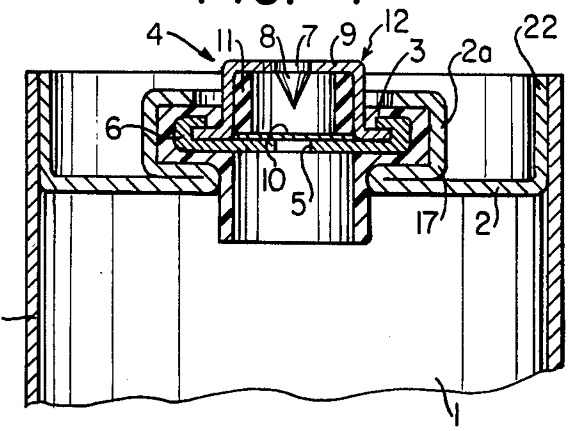
FIG. 4 is a sectional view showing principal parts of a sealed type battery according to the present invention.

Referring now to FIG. 4, reference numeral 1 designates an exterior can serving as a terminal of positive polarity including a generator element (not shown) and reference numeral 2 designates a metallic cover for closing an opened portion of the exterior can 1. The metallic cover 2 is fixedly mounted on the exterior can 1 by the laser welding. A hole portion of the metallic cover 2 is provided with an extension 2*a*. A mouth-sealing plate 4 serving as a terminal of the other polarity is fixedly mounted on said hole portion through the insulating member 3 by cramping the extension 2*a* to an outside surface of the insulating member 3.

The mouth-sealing plate 4 is provided with a highly accurate safety valve 12 comprising a mouth-sealing cover 6 provided with a valve hole 5, a flat head plate 9 provided with a vent hole 7 and a cutting blade 8, a flexible thin plate 10 always closing the valve hole 5 and an elastic member 11.

Next, a method of manufacturing a sealed type battery having such a construction will be below described.

At first, a method of fabricating the metallic cover 2 is described with reference to FIG. 5.

Figure 5:
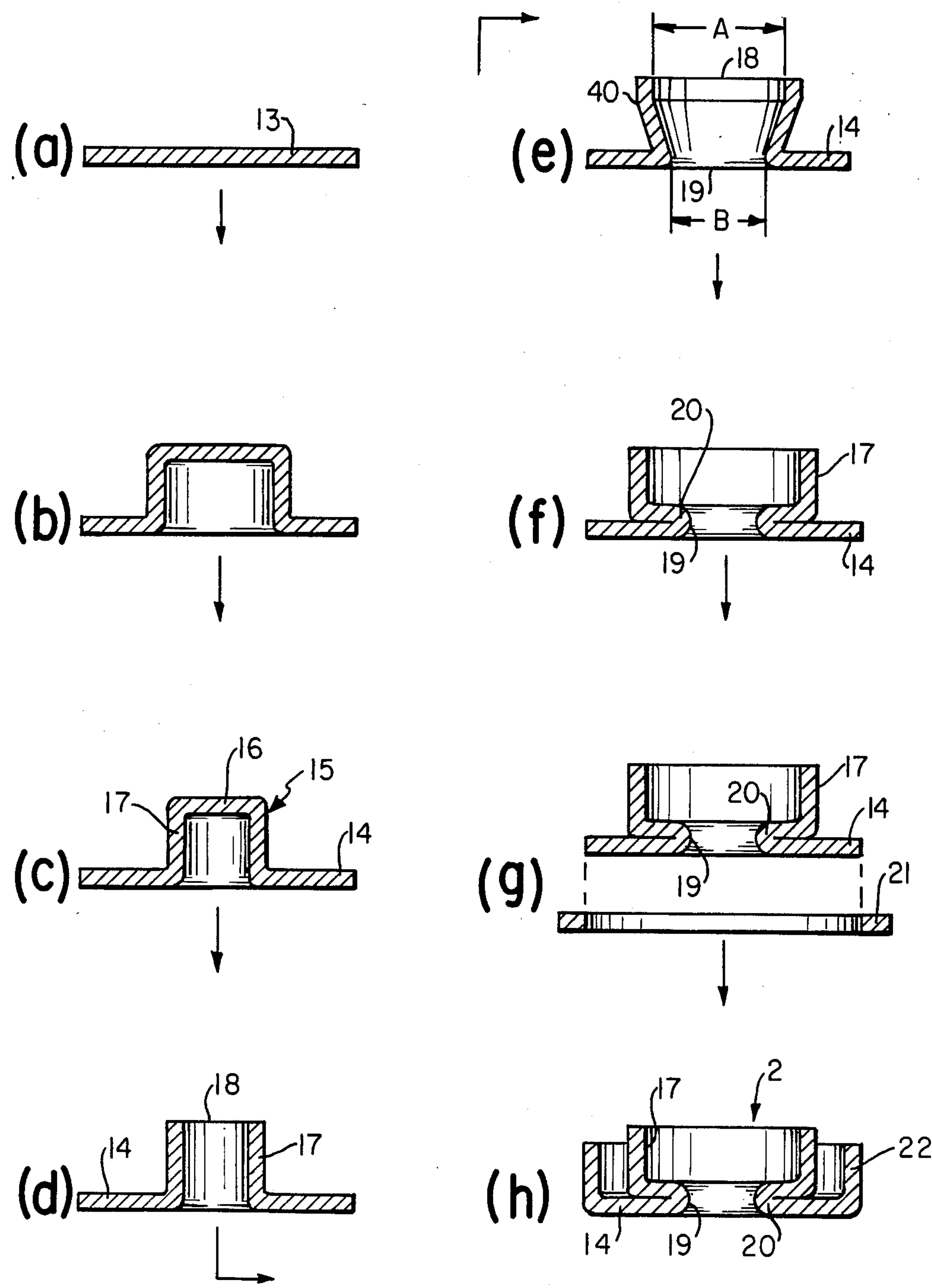
FIG. 5 is a schematic diagram showing a manufacturing process of a metallic cover in a method of manufacturing a sealed type battery according to the present invention.

A metallic plate 13 made of SUS304 as shown in FIG. 5 (*a*) is drawn in turn dividing into a plurality of times [FIG. 5(*b*)] to form a bottomed cylindrical member 15 provided with a collar member 14 on an opened edge, a bottom 16 and a cylindrlcal portion 17, as shown in FIG. 5(*c*), and then the bottom 16 of the bottomed cylindrical member 15 is punched in the punching process to separate the bottom 16 from the cylindrical member 17, as shown in FIG. 5(*d*). Subsequently, the cylindrical portion 17 is expanded in the mouth-expanding process so that an inside diameter A of a portion 18 of a side where the bottom 16 is separated may be larger than an inside diameter B of an opening 19 of a side of the collar portion 14, as shown in FIG. 5(*e*), and the forming process is carried out so that a joint portion 20 connecting the cylindrical portion 17 having a larger diameter with the collar portion 14 may be engaged with or close to the collar portion 14, as shown in FIG. 5(*f*).

And, subsequently, in the blanking process, an excessive portion 21 is removed from the collar portion 14 by cutting a circumference of the collar portion 14, as shown in FIG. 5(*g*), and in the periphery-drawing process, an end portion of the collar portion 14 is made ascend on a side where the cylindrical portion 17 is positioned to form an ascending portion 22, whereby fabricating the metallic cover 2 which is not provided with a safety valve yet, as shown in FIG. 5(*h*).

In a method of manufacturing a sealed type battery according to the present invention, it is intended to fix the mouth-sealing plate 4 provided with the safety valve 12 by cramping the mouth-sealing plate 4 to the metallic cover 2 through the insulating member 3. The metallic cover 2 is provided with the collar portion 14 serving as a cover and the cylindrical portion 17 for fixing the mouth-sealing plate 4 by cramping.

However, the mouth-sealing plate 4 can not be fixed in the cylindrical portion 17 by cramping by merely integrating the collar portion 14 with the cylindrical portion 17, as shown in FIG. 5(*d*). Accordingly, it is necessary to form a portion for supporting the insulating member 3 and the mouth-sealing plate 4 at a lower end of the cylindrical portion 17 in order to fix the mouth-sealing plate 4 by cramping. Consequently, according to the present invention, the inside diameter A of the cylindrical portion 17 is made larger than the inside diameter 8 of the opening 19 of the collar portion 14 in the above described manner to give a difference between the collar portion 14 and the cylindrical portion 17 in inside diameter, whereby supporting the insulating member 3 and the mouth-sealing plate 4 by a step formed at the joint portion 20.

Figure 6:
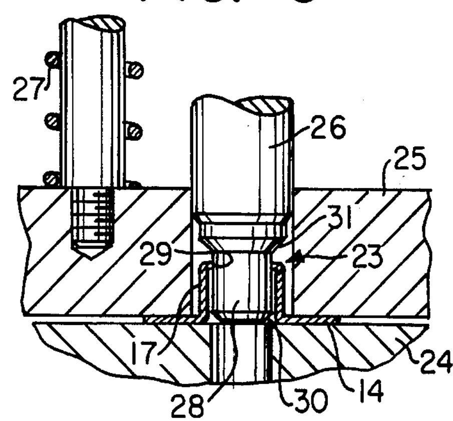
FIG. 6 is a schematic diagram showing a working method in the process (e) shown in FIG. 5.
Figure 7:
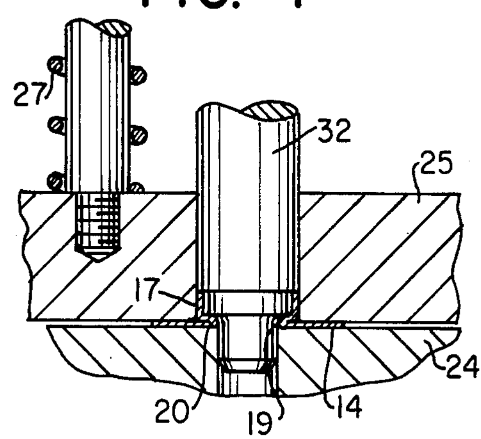
FIG. 7 is a schematic diagram showing a working method in the process (f) shown in FIG. 5.

FIGS. 6, 7 show a preferable method for forming this step, in short, (e): the mouth-expanding process and (f): the forming process in the process shown in FIG. 5.

The previous separation of the bottom 16 from the cylindrical portion 17 of the bottomed cylindrical member 15 provided with the collar member 14 leads to the possibility that a jig can be easily inserted into the cylindrical portion 17 through an opening formed by this separation to easily increase a diameter of the cylindrical portion 17. Concretely describing, as shown in FIG. 6, a cylindrical member 23 provided with a collar member 14 made of a metal having been formed with a bottom 16 previously separated is placed on a receiving table 24 by positioning and then a drawing table 25 and a drawing punch 26 are made descend toward the cylindrical member 23 provided with the collar member 14 to put the collar member 14 of the cylindrical member 23 between the drawing table 25 and the receiving table 24. At this time, an elastic force is downwardly applied to the drawing table 25 by a plurality of spring members 27 to put the collar member 14 between the receiving table 24 and the drawing table 25 by this elastic force.

In addition, an outside diameter of a pointed end portion 28 of the drawing punch 26 is identical with or slightly smaller than an inside diameter of an opening 29 formed by separating a bottom of the cylindrical member 23 by cutting. In addition, since the drawing punch 26 is provided with a tapered portion 30 formed around a circumference of the pointed end thereof, the pointed end portion 28 of the drawing punch 26 is easily inserted into the opening 29 of the cylindrical member 23 and the cylindrical member 23 is accurately positioned by inserting the pointed end portion 28 into the opening 29. Subsequently, an inside diameter of the cylindrical portion 17 of the cylindrical member 23 is gradually increased from a side of the opening 29 along an inclined wall 31 formed so as to gradually increase a diameter from the pointed end portion 28 of the drawing punch 26, whereby the forming process is carried out as shown in FIG. 5(*e*).

Subsequently, as shown in FIG. 7, a part of the inclined wall 31 of the drawing punch 26 shown in FIG. 6 is formed as shown in FIG. 5(*f*) by the use of the drawing punch 32 changed into a form so as to match a final shape to be formed in the forming process in the same manner.

Figure 8:
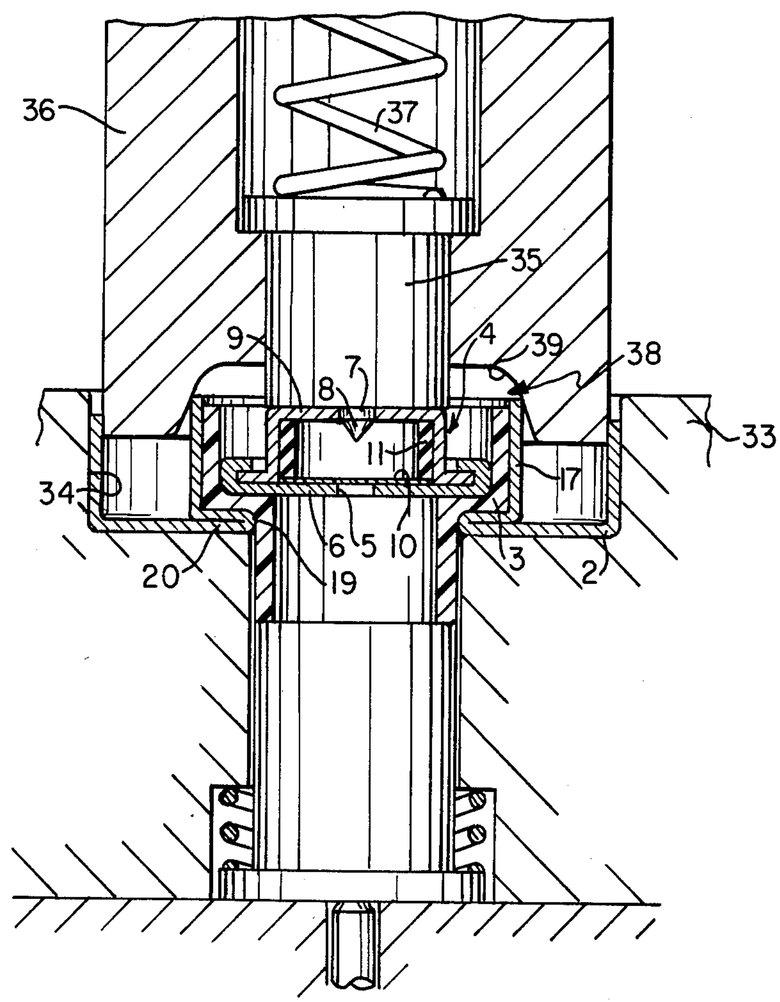
FIG. 8 is a schematic diagram showing a process of cramping a mouth-sealing plate provided with a safety valve to a metallic cover in a method of manufacturing a sealed type battery according to the present invention.

The metallic cover 2, which has been fabricated through a series of such process, is provided with the mouth-sealing plate 4 provided with the safety valve 12. A method of providing this mouth-sealing plate 4 is below described with reference to FIG. 8.

The mouth-sealing plate 4 is placed on the joint portion 20 within the cylindrical portion 17 of the metallic cover 2 through the insulating member 3 made of resins, and the metallic cover 2, on which the mouth-sealing plate 4 has been placed, is placed within a dent 34 of a cramping table 33. Then, a counter jig 35 and a cramping punch 36 are made descend toward the metallic cover 2 to press an upper surface of the safety valve 12 by the counter jig 35. At this time, an elastic force is downwardly applied to the counter jig 35 by a spring member 37 and this elastic force prevents the mouth-sealing plate 4 from rising, so that no wrong cramping due to the rise of the mouth-sealing plate 4 is produced. Subsequently, upon making the punch 36 further descend under the condition that the upper surface of the mouth-sealing plate 4 is pressed by the counter jig 35, the cylindrical portion 17 of the metallic cover 2 is inwardly bent from an opened end thereof along an inside wall 39 of the dent 38 of the cramping punch 36 to strongly fix the mouth-sealing plate 4 within the cylindrical portion 17 of the metallic cover 2 through the insulating member 3, as shown in FIG. 4.

Figure 9:
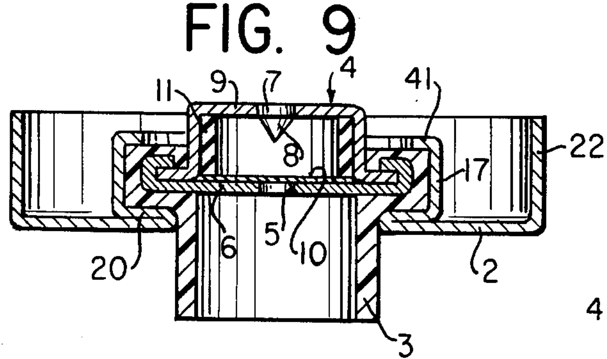
FIG. 9 is a sectional view showing the metallic cover to which the mouth-sealing plate provided with the safety valve is cramped.

In this cramping process, if there is a big gap between a lower end portion 40 of the cylindrical portion 17 and the collar portion 14, as shown in FIG. 5(*e*), in the case where the cramping punch 36 is made descend to apply a force inwardly cramping the opened end of the cylindrical portion 17, at first the cylindrical portion 17 is made descend together with the cramping punch 36 until the lower end portion 40 thereof is engaged with the collar portion 14 and then the cramping process is carried out, whereby an inwardly bent portion 41 of the opened end of the cylindrical portion 17 is reduced in length, as shown in FIG. 9, and as a result, the mouth-sealing plate 4 can not be fixed to the metallic cover 2 by a sufficient force.

In addition, if there is a big gap between the lower end portion 40 of the cylindrical portion 17 and the collar portion 14 in the above described manner, the mouth-sealing plate 4 is changed in position and the like before and after the cramping process, so that a large number of changes resulting from the cramping process are produced, whereby it is difficult to control these and eliminate a dimensional error.

The metallic cover 2 provided with the mouth-sealing plate 4 is mounted on the opened portion of the exterior can 1, as shown in FIG. 4, and the opened end 1*a* of the exterior can 1 is welded to the ascending portion 22 of the metallic cover 2 by the laser welding method to manufacture a sealed type battery according to the present invention.

According to the present invention, the bottom 16 of the bottomed cylindrical member 15 provided with the collar portion 14 around the opened edge is separated from the cylindrical portion 17 by cutting, as shown in FIG. 5(*d*), whereby the jig can be inserted into the cylindrical portion 17 through the formed opening 18, so that an inside diameter of the cylindrical portion 17 can be easily made larger than that of the opening 19 of a side of the collar portion 14. In addition, since the cylindrical member 23 is previously worked so that the joint portion 20 connecting the cylindrical portion 17 having a larger diameter with the opening 19 of a side of the collar portion may be engaged with or close to the collar portion 14, in the case where, in order to fix the mouth-sealing plate 4 (mouth-sealing cover 6) within the cylindrical portion 17 through the insulating member 3, a force for cramping the opened end of the cylindrical portion 17 is applied, almost all of a force applied in a direction of making the end portion of a side of the joint portion 20 of the cylindrical portion 17 engaged with the collar portion 14 is utilized for cramping, so that the sealing by cramping can be surely attained.

Figure 1:
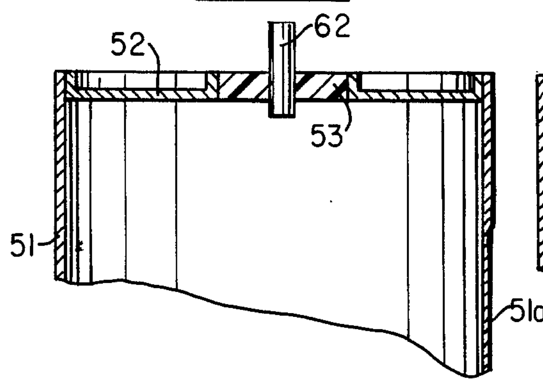
FIGS. 1 to 3 are sectional views showing principal parts of the conventional sealed type battery.
Figure 2:
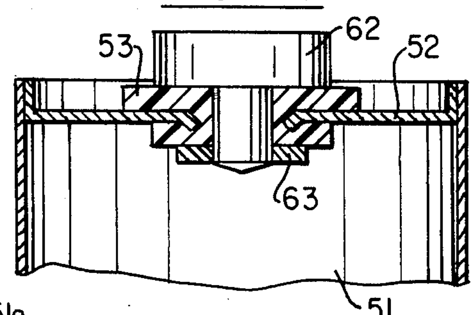
Figure 3:
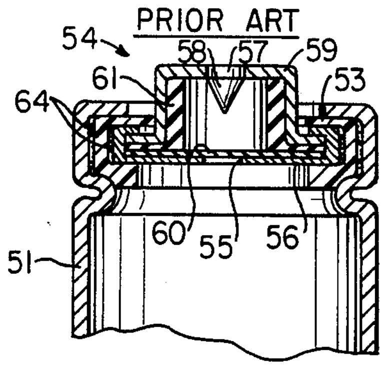

In addition, since not only a diameter of an assembly obtained by integrating the metallic cover 2, mouth-sealing plate 4 and insulating member 3 by cramping is smaller than that of the conventional battery shown in FIG. 3 but also no liquid is accumulated in the cramping process since the metallic cover 2 is provided with the exterior can 1, into which an electrolyte has been poured, at the opened portion thereof after the integration by cramping. Furthermore, since the metallic cover 2 is fixedly mounted on the exterior can 1 by welding, a sealed type battery having a high hermeticity and superior in liquid-leakage resistance can be obtained. In addition, this sealed type battery can be provided with the highly accurate safety valve 12 at the mouth-sealing plate 4 to improve the safety.

Figure 10:
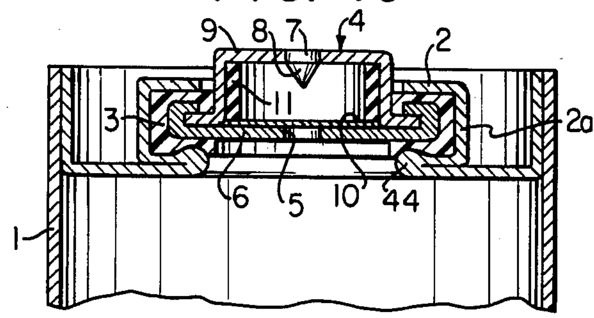
FIG. 10 is a sectional view showing principal parts in another preferred embodiment of the sealed type battery according to the present invention.
Figure 10:
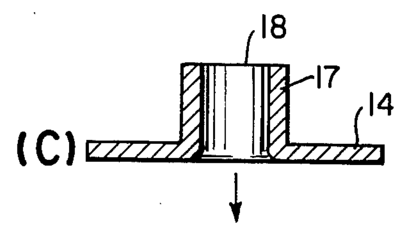

FIG. 10 is a sectional view showing principal parts of a sealed type battery according to another preferred embodiment of the present invention, in which the extension 2*a* of the metallic cover 2 is provided with a projection 44 formed on the joint portion 20 opposite to the insulating member 3. In addition, in FIG. 10 the same parts as in FIG. 4 are marked with the same reference numerals as in FIG. 4 and other constructions are same as in the preferred embodiment shown in FIG. 4, so that their description is omitted.

Figure 11:
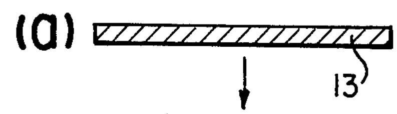
FIG. 11 is a schematic diagram showing a manufacturing process of the metallic cover of the sealed type battery shown in FIG. 10.
Figure 11:
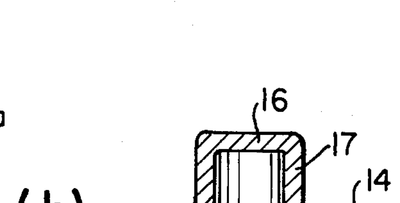

In addition, FIG. 11 is a schematic diagram showing a process of fabricating the metallic cover 2 according to this preferred embodiment and the processes of FIG. 11(*a*) to (c) correspond to the processes of FIG. 5(*a*) to (*d*), so that their description is omitted. In the forming process of FIG. 11(*d*), the cylindrical portion 17 is expanded (the mouth-expanding process) so that an inside diameter A of the opening 18 of a side, where the bottom 16 is separated, may be larger than an inside diameter B of the opening 19 of a side of the collar portion 14 and worked so that the joint portion 20 connecting the cylindrical portion 17 with the collar portion 14 may be engaged with or close to the collar portion 14. At this time, according to the present preferred embodiment, the joint portion 20 is provided with a projection 44 formed at a position opposite to the insulating member 3. Finally, in FIG. 11(*e*), the collar portion 14 is subjected to an ascending work in the same manner as in the process shown in FIG. 5(*h*) to form the ascending portion 22, whereby obtaining the metallic cover 2.

Subsequently, the metallic cover 2, mouth-sealing plate 4 and insulating member 3 are integrated in the same manner as in the above described preferred embodiment and the resulting assembly is mounted on the opened portion of the exterior can 1, into which an electrolyte has been poured, followed by finally fixing the joint portion of the metallic cover 2 and the exterior can 1 by the laser welding method to manufacture the sealed type battery as shown in FIG. 10.

In this preferred embodiment, since not only no liquid is accumulated in the cramping process, in which the end portion of the extension 2*a* of the metallic cover 2 is compressed to the insulating member 3 to fix the mouth-sealing plate 4, but also the high hermeticity can be attained and the leak resistance can be improved since the metallic cover 2 is provided with the projection 44 formed at a position opposite to the insulating member 3 of the extension 2*a*, whereby the projection 44 is cut into the insulating member 3 in the cramping process.

Figure 13:
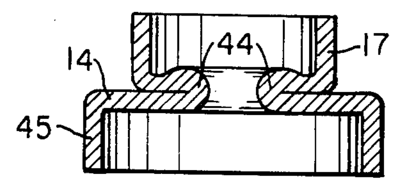
FIG. 13 is a sectional view showing the metallic cover of the sealed type battery shown in FIG. 12.
Figure 12:
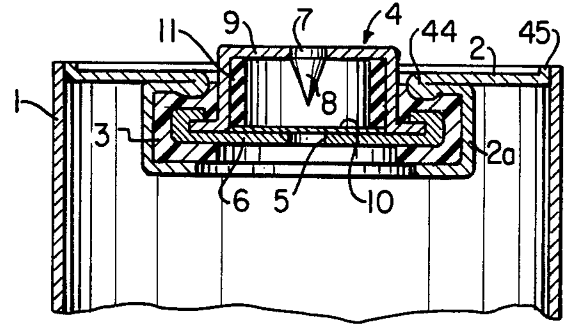
FIG. 12 is a sectional view showing principal parts in still another preferred embodiment of the sealed type battery according to the present invention.
Figure 12:
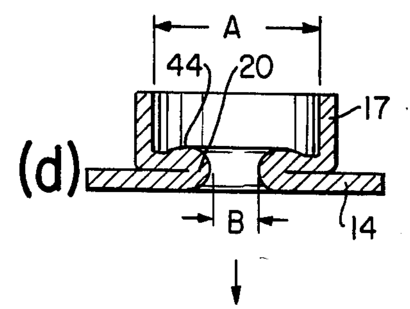
Figure 12:
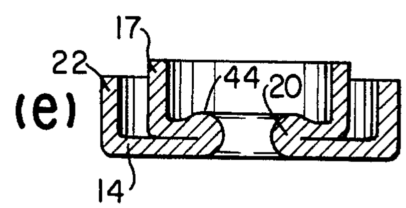

In addition, FIG. 12 is a sectional view showing principal parts of the sealed type battery according to still another preferred embodiment of the present invention; and FIG. 13 is a sectional view showing the metallic cover 2 used in this preferred embodiment.

In this preferred embodiment, in the working process of the collar portion 14 [FIG. 11(*e*)], the ascending portion 22 is not formed as in the above described preferred embodiment but a descending portion 45, which is obtained by working in an opposite direction, is formed. Also in this preferred embodiment, it goes without saying that the same effects as in the above described preferred embodiment can be attained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A sealed type battery provided with a safety valve, characterized by comprising an exterior which can includes a generator element and serves as a terminal of one polarity, a metallic cover provided with a hole at a central portion thereof, with an extension formed in an axial direction along said hole and an edge portion fixedly mounted on said exterior can in an electrically conductive manner to close an opened portion of said exterior can at a middle portion between the extension and the edge portion, a mouth-sealing plate which is provided with a safety valve and serves as a terminal of the other polarity and an insulating member being put in the hole of said metallic cover between the extension of the metallic cover and the mouth-sealing plate, and said extension of the metallic cover being cramped to said insulating member to fix said mouth-sealing plate.

2. A sealed type battery provided with a safety valve as set forth in claim 1, in which a base of the extension of said metallic cover is bent toward a central side to form an inner flange.

3. A sealed type battery provided with a safety valve as set forth in claim 2, in which the base of the extension of said metallic cover is engaged with a central portion side of the middle portion.

4. A sealed type battery provided with a safety valve as set forth in claim 2, in which a projection is formed on a side where said base of the extension of the metallic cover is engaged with said insulating member.

5. A sealed type battery provided with a safety valve as set forth in claim 1, in which said edge portion is extended in an axial direction along an inside surface of the exterior can.

6. A sealed type battery provided with a safety valve as set forth in claim 1, in which said mouth-sealing plate is provided with a collar portion, the insulating member being put between said collar portion and the extension of said metallic cover, and said extension being cramped to fix said mouth-sealing plate.

7. A sealed type battery provided with a safety valve as set forth in claim 1, in which said insulating member is cylindrical and a portion engaged with the extension of the metallic cover is thicker than other portion.

8. A method of manufacturing a sealed type battery provided with a safety valve, in which a metallic cover fixedly mounted on an exterior can serving as a terminal of one polarity is fixedly mounted on a mouth-sealing plate, provided with a safety valve, serving as a terminal of the other polarity through an insulating member, characterized by that a metallic sheet is drawn to form a bottomed cylindrical member provided with a collar portion at an opened edge, an opening being formed at a bottom of said bottomed cylindrical member followed by forming a cylindrical portion so that an inside diameter thereof may be larger than that of the opening of a side of the collar portion, the cylindrical portion being subjected to a bending so that a portion of the side of the collar portion thereof may be engaged with or close to an inside portion of the collar portion to obtain the metallic cover, subsequently, the mouth-sealing being arranged in the cylindrical portion of the metallic cover subjected to the bending through the insulating member, the cylindrical portion subjected to the bending being cramped to said insulating member to fix said mouth-sealing plate to the metallic cover followed by housing a generator element in the exterior can and said metallic cover being fixedly mounted on the opened portion of said exterior can in an electrically conductive manner and sealed.

9. A method of manufacturing a sealed type battery provided with a safety valve as set forth in claim 8, in which a portion opposite to the insulating member of the side of the collar portion of the formed cylindrical portion is formed in a projection-like shape.

10. A method of manufacturing a sealed type battery provided with a safety valve as set forth in claim 8, in which a jig which has an outside profile similar to the extension of the metallic cover is inserted into the formed cylindrical portion through an opening opposite to the collar portion to bend the cylindrical portion from the inside thereof.

* * * * *